United States Patent [19]

Enabnit

[11] 4,099,157
[45] Jul. 4, 1978

[54] SINGLE WIRE POWER/SIGNAL SYSTEM FOR VEHICLE AUXILIARY DEVICES

[75] Inventor: Robert S. Enabnit, Akron, Ohio

[73] Assignee: The Goodyear Tire & Rubber Company, Akron, Ohio

[21] Appl. No.: 753,660

[22] Filed: Dec. 22, 1976

[51] Int. Cl.² .............................................. B60Q 1/00
[52] U.S. Cl. ................................. 340/52 F; 340/507; 340/538; 340/691; 307/10 R
[58] Field of Search .................... 340/52 R, 52 F, 58, 340/59, 213 R, 253 R, 253 H, 253 Z, 412, 416, 216; 307/10 R

[56] References Cited

U.S. PATENT DOCUMENTS 3,651,454  3/1972  Venema et al. .................... 340/52 F
3,665,384  5/1972  Ives ................................... 340/52 F

*Primary Examiner*—Alvin H. Waring
*Attorney, Agent, or Firm*—L. A. Germain

[57] ABSTRACT

Both power to and detection signals from a remotely located condition monitoring device are provided via a single wire with return through the vehicle frame. A load switching circuit connected and responsive to the output of the condition monitoring device causes a particular current to be drawn from the line when the device and signal status are normal than when either is not. An indicator circuit connected into the line and responsive to the current drawn by the device and loading circuit provides a failsafe indication to the operator of the monitored condition and/or operational status of the system circuitry.

7 Claims, 5 Drawing Figures

SINGLE WIRE POWER/SIGNAL SYSTEM FOR VEHICLE AUXILIARY DEVICES

BACKGROUND OF THE INVENTION

This invention generally relates to electrical signalling systems and more specifically to a single wire signalling scheme for vehicle condition monitoring devices wherein power for the device is transmitted to and detection signals are received from the remotely located device using the single wire with ground return through the vehicle frame.

In recent years the number of auxiliary electrical devices marketed for vehicle use has dramatically increased. Among these are electronic apparatus for monitoring all phases of vehicle operation. Past practice has been to design apparatus that may be installed on or adpated to any type vehicle and thus marketed as optional equipment. Presently, however, vehicle manufacturers have increased the number of hazard warning and/or condition monitoring devices that are installed as original equipment. Whether original or optional equipment, the installation poses a problem in that wiring must be provided such that power may be made available for device operation and the signals indicative of a particular condition occurrence may be transmitted back to the operator and timely action taken.

It is thus an object of this invention to simplify and reduce the costs of installing auxiliary devices by providing apparatus for single wire transmission of power to and detection signals from remotely located devices.

The features and advantages of the invention will be better understood from a consideration of the following description when taken in conjunction with the accompanying drawings in which.

Figure 1:
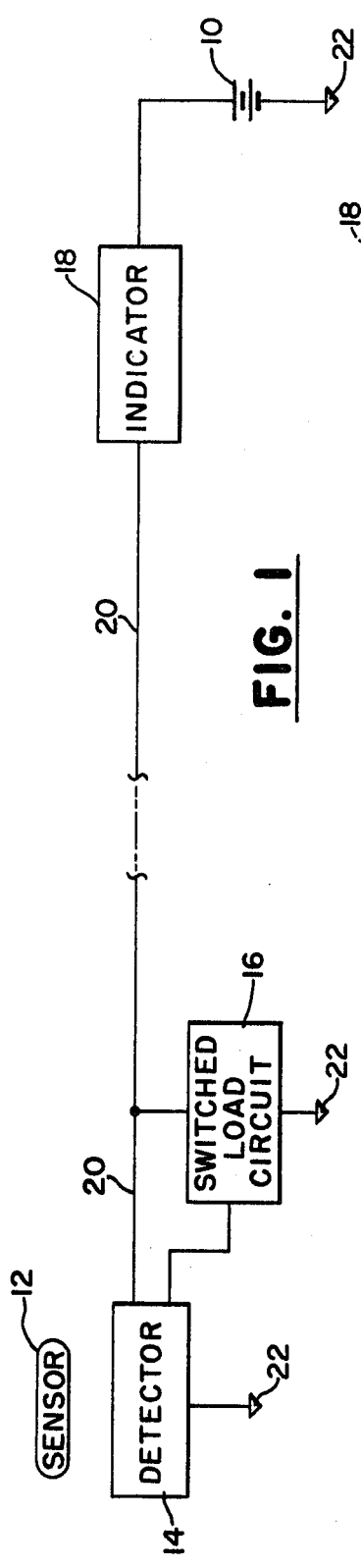
FIG. 1 is a schematic block diagram generally illustrating the principle of the invention as it may be applied to a vehicle condition monitoring system.

Referring to the drawings, FIG. 1 generally illustrates the principle of the invention as it may be applied to a vehicle condition monitoring system comprising a source of D.C. power 10, a sensor 12 for monitoring a specific condition occurrence, a detector 14 responsive to the state of the sensor 12, an electrical loading circuit 16 responsive to the state of the detector 14, and an indicator 18 for providing a visual indication of the monitored condition and/or state of the circuitry.

More specifically, the invention is directed to providing power by reason of a battery 10 for the remote detector 14 via a single connecting wire 20 with return through the vehicle frame 22 while also providing a signal to the indicator 18 indicative of the sensed change in condition using the same connector 20. The invention is accomplished in a circuit arrangement which will hereinafter be described in conjunction with condition monitoring detector circuits 14 as exemplified in U.S. Pat. Nos. 3,665,387 issued May 23, 1972 and/or 3,831,161 issued Aug. 20, 1974, to Robert S. Enabnit and assigned to The Goodyear Tire & Rubber Company, Akron, Ohio, wherein the presence or absence of pulses from the detector circuit as indicative of a sensed condition.

Figure 2:
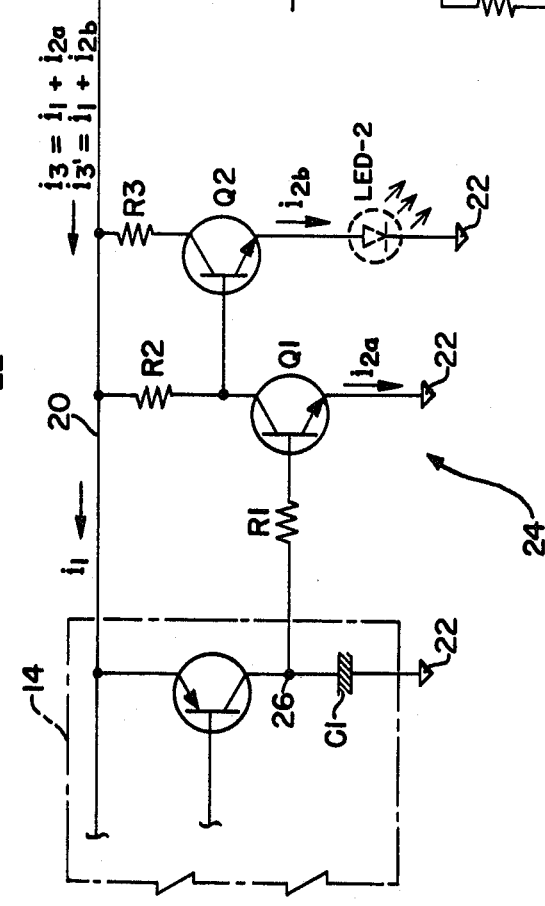
FIG. 2 is a schematic circuit diagram illustrating an embodiment of the invention as it is applied to constant level signals.

Referring to FIG. 2, a detector 14 in accordance with either of the above-cited patents and showing only a portion of its output circuitry, provides an output signal that maintains a capacitor C-1 in a charged state as long as the condition being monitored by the sensor 12 is normal. Power for the detector is provided via line 20 by the battery 10 with ground return through the vehicle frame indicated by reference numeral 22. Absent circuitry comprising the instant invention, the system draws a current $i_1$ (conventional current direction shown) to power the detector 14. In accordance with the teaching of this invention, however, a switched loading circuit generally indicated by reference numeral 24 is connected to the detector output at node 26 and is responsive to the charged state of capacitor C-1. Circuit 24, in a negative ground system, comprises a common-emitter connected NPN type transistor Q-1 that has its base lead connected through a resistor R-1 to the detector output at 26, its emitter lead connected to ground 22, and its collector lead connected to line 20 through a resistor R-2. Further, circuit 24 includes a second transistor Q-2 having its base lead connected and responsive to the collector output of transistor Q-1, its emitter lead connected to ground 22, and its collector lead connected to line 20 through a resistor R-3. Also, on line 20, is an indicator circuit 18 that is remotely located from the detector and series connected between the detector and battery 10, which indicator circuit comprises a light emitting diode LED-1 in parallel with a resistor R-4.

In normal operation, i.e. the absence of an abnormal condition occurrence, the charge on capacitor C-1 is maintained such that transistor Q-1 is conductive and a current $i_{2a}$ exists. This current biases transistor Q-2 to cut-off by virtue of the voltage drop across resistor R-2 and a current $i_3 = i_1 + i_{2a}$ is drawn on line 20 through the indicator circuit 18. Line current $i_3$ provides a voltage across resistor R-4 insufficient to exceed the reverse breakdown level of LED-1 which is a red luminous energy emitter. The breakdown voltage of the LED is relatively independent of current and in the normal condition of the sensor 12, no luminous energy is emitted. Alternately, when the charge on capacitor C-1 is not maintained by the detector output, i.e., an abnormal condition occurrence is sensed by sensor 12, the bias on transistor Q-1 is lowered to cut off current $i_{2a}$ and the base voltage on transistor Q-2 increases to its "switch-on" level. Transistor Q-2, therefore, conducts and a much larger current $i_{2b}$ is drawn on line 20. A current $i_{3'} = i_1 + i_{2b}$ is drawn through the indicator circuit 18 and the voltage across resistor R-4 is increased above the reverse breakdown level of the LED. LED-1, therefore, emits red luminous energy and the occurrence of an abnormal condition is recognized.

Further, with respect to the load switching circuit of FIG. 2, an optional red light emitting diode LED-2 (shown as ghost lines) may be connected in the emitter circuit of transistor Q-2. In this circumstance, LED-2 acts as a status indicator at the detector site having the same indicating sense as the remote indicator comprising LED-1. This arrangement provides easy troubleshooting when multiple detectors are involved, such as, for example, in an individual vehicle tire monitoring application, as exemplified in the before-mentioned patents.

Figure 3:
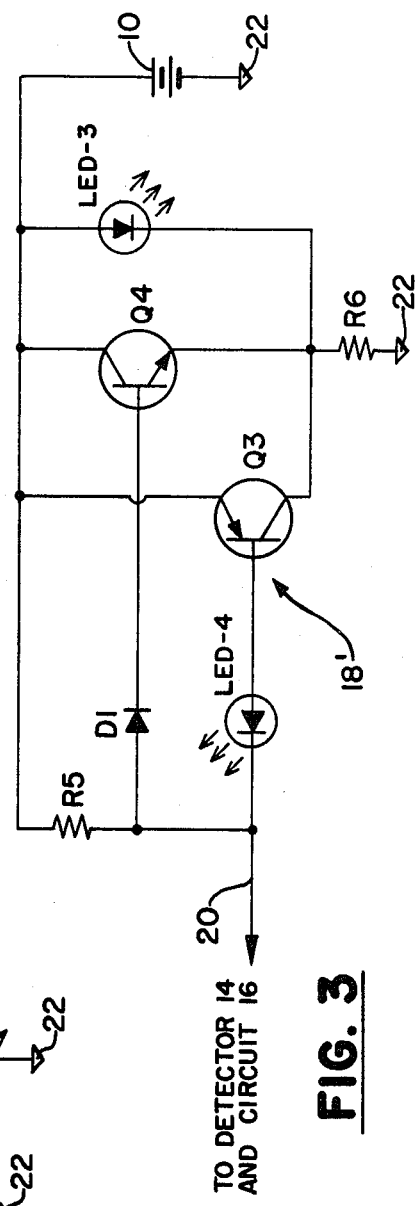
FIG. 3 is a schematic circuit diagram of a circuit for providing an indication of both normal and abnormal system conditions.

Continuing now with reference to FIG. 3, a second embodiment of the indicator circuit 18 is illustrated and generally indicated by reference numeral 18'. This embodiment, again, with reference to a negative ground system, comprises a PNP type transistor Q-3 having its base connected to line 20 through a red energy emitter LED-4, its collector lead connected to ground 22 through a resistor R-6, and its emitter lead connected to the positive side of the D.C. supply 10. Across the emitter-collector junction of Q-3 is a green energy emitter LED-3 while across the emitter of Q-3 and LED-4 is a resistor R-5. Again, the monitored condition status and detector output are normal when the current on line 20 is low compared to an abnormal condition status when the current is relatively high. Now, therefore, a lower current is drawn through resistor R-5 than when the condition is abnormal and the resultant voltage drop across R-5 and the emitter-base junction of Q-3 is insufficient for ignition of red LED-4 and it is "off". By the same token, the voltage across the emitter-collector junction of Q-3 exceeds the ignition level for green LED-3 and it is "on" indicating the normal condition. Alternately, when an abnormal condition is sensed and an output indicative of such abnormal condition is provided by the detector 14, a higher current is drawn on line 20 through resistor R-5 which provides a turn-on voltage for red LED-4 while the current through Q-3 is also increased lowering the voltage across green LED-3 below its ignition level and it is turned "off". Thus, it should be appreciated that both the normal and abnormal conditions are recognized by indicator circuit 18' by virtue of the magnitude of the current existing on line 20.

Further, with respect to FIG. 3, an NPN type transistor Q-4 is shown base connected to line 20 through a diode D-1 and having its emitter lead connected to the source of D.C. power 10 and its collector lead connected to ground 22 through resistor R-6. If, for example, line 20 should become open-circuited so that no current is drawn, the base of transistor Q-4 is biased positively through diode D-1 and the reduced voltage drop across resistor R-5 and the resutling voltage drop across the emitter-collector of Q-4 is insufficient to maintain the green emitting LED-3 in a "lit" state. Thus, the open circuit malfunction is recognized independent of either the normal or abnormal monitored conditions.

Figure 4:
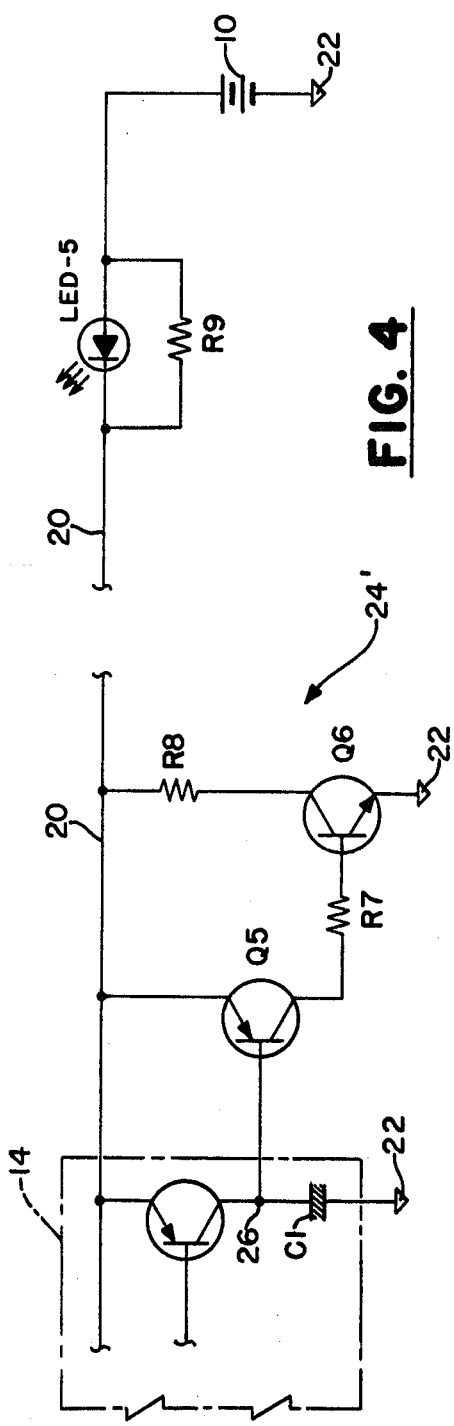
FIG. 4 is a schematic circuit diagram illustrating an alternate embodiment and mode of operation.

FIG. 4 illustrates a load circuit 24' arranged to draw more $i_3$ current when a normal monitored condition exists while drawing relatively less current when an abnormal condition is sensed. In this circumstance, a PNP type transistor Q-5 is provided that is base connected and responsive to the charge on detector capacitor C-1 such that a second transistor Q-6 is conductive, drawing a high current on line 20. To indicate the normal status condition, a green LED-5 is connected in line 20 in parallel with a resistor R-9 that provides a voltage drop across the LED exceeding the ignition level and the LED is "on" indicating the normal condition. Alternately, an abnormal condition is indicated by a drop in line current resulting in a corresponding drop in voltage across R-9 which is below the ignition level of LED-5 and it is "off". Thus, a no-light indication provides the operator with information relative to the presence of an abnormal condition occurrence sensed by sensor 12.

Figure 5:
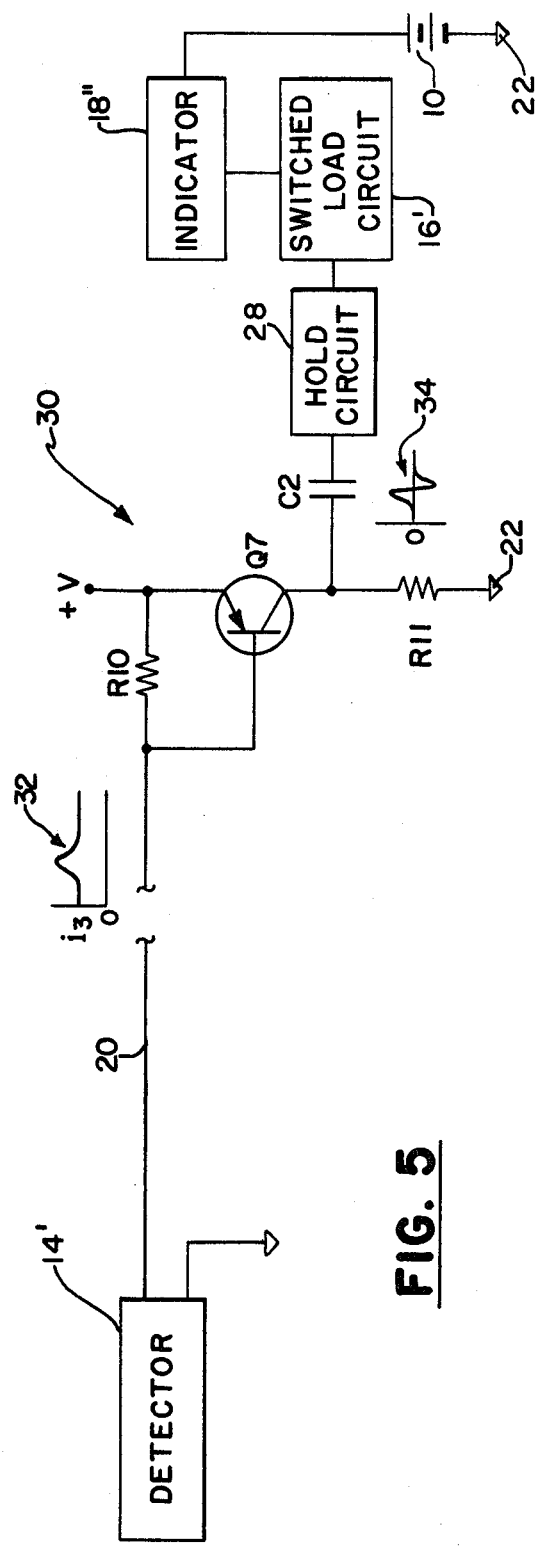
FIG. 5 is a schematic circuit diagram illustrating an embodiment of the invention as it is applied to pulse type signals.

Now, therefore, while the preceding circuits may be applied to detectors 14 that communicate information by reason of a substantially constant signal level maintained on line 20, FIG. 5 illustrates a circuit embodiment 30 for the situation wherein a pulse signal 32 is drawn on the line 20. In this circumstance, capacitor C-1 in the detector circuit 14 is of such low value as to permit the $i_3$ current to vary with the pulses produced in the detector. This pulsed current produces a voltage drop across a resistor R-10 sufficient to cause a PNP type transistor Q-7 to conduct during the same pulse period and a corresponding voltage drop appears across resistor R-11. These pulses are isolated from any steady state level by a capacitor C-2 and the resulting pulses 34 are used to operate a hold circuit 28 similar to that shown in FIG. 2 comprising C-1 a switched loading circuit 16; and an indicator circuit 18" similar to either of those herebefore discussed.

While the preceding description was primarily directed to vehicle electrical systems of the negative ground type, it is anticipated that the invention is equally applicable to positive ground type systems. The changes and modifications necessary to accomplish this will be apparent to those skilled in the electronic arts and, therefore, the invention is considered limited only by the scope of the appended claims.

What is claimed is:

1. In a vehicle electrical system including a source of D.C. power, monitoring means providing an output signal indicative of a monitored condition, and a single wire line interconnecting the source and monitoring means such that line current provides continual power to the monitoring means with ground return through the vehicle frame, apparatus providing information indicative of the monitored condition using the single connecting line comprising:

A. A loading circuit connected and responsive to the output signal from the monitoring means and connected to the single interconnecting line to draw a line current of a first magnitude when the monitored condition and signal status are normal and a line current of a second magnitude when the monitored condition and signal status are abnormal; and B. An indicator circuit connected in the line remote from the monitoring means and responsive to the magnitude of the line current such that a change in the magnitude switches the indicator to an alternate state for an indication of the abnormal monitored condition.

2. The apparatus as set forth in claim 1 wherein the loading circuit comprises:

A. A first loading circuit connected and responsive to the monitoring means output to draw a current of a first magnitude when the monitoring means output is indicative of a normal monitored condition; and B. A second loading circuit connected and responsive to the first loading circuit such that a change in the monitoring means output indicative of the occurrence of an abnormal monitored condition causes more current to be drawn on the line due to the second loading circuit than was drawn due to the first loading circuit.

3. The apparatus as set forth in claim 2 wherein the indicator circuit comprises a voltage sensitive, red light emitting diode connected in parallel with a resistance such that an increase in line current due to an abnormal monitored condition switches the diode to a light emitting state due to a voltage increase across the resistance that exceeds the threshold level of the diode.

4. The apparatus as set forth in claim 1 wherein the loading circuit comprises:
   A. A first loading circuit connected and responsive to the monitoring means output to draw a current of a first magnitude when the monitoring means output is indicative of a normal monitored condition; and
   B. A second loading circuit connected and responsive to the first loading circuit such that a change in the monitoring means output indicative of the occurrence of an abnormal condition causes less current to be drawn on the line due to the second loading circuit than was drawn due to the first loading circuit.

5. The apparatus as set forth in claim 4 wherein the indicator circuit comprises a voltage sensitive, green light emitting diode connected in parallel with a resistance such that a decrease in line current due to an abnormal monitored condition switches the diode to a non-light emitting state due to a voltage decrease across the resistance that is below the threshold level of the diode.

6. The apparatus as set forth in claim 2 wherein the indicator circuit comprises a green light emitting diode circuit connected on the line and responsive to the current drawn by the first loading circuit to provide an indication indicative of the normal monitored condition and a red light emitting diode circuit connected on the line and responsive to the current drawn by the second loading circuit such that a change in monitored condition switches the red emitting diode to "on" indication indicative of the occurrence of an abnormal condition while the green emitting diode is switched "off".

7. The apparatus as set forth in claim 6 wherein the indicator circuit further comprises circuit means connected in the green light emitting diode circuit and responsive to the current drawn on the line such than an open-circuited line causes the green emitting diode to be switched to an "off" indication.

* * * * *